US012590197B2

(12) United States Patent     (10) Patent No.:   US 12,590,197 B2

Masson et al.     (45) Date of Patent:    Mar. 31, 2026

(54) BIO-BASED CARBON FOAM

(71) Applicant: Stora Enso OYJ, Helsinki (FI)

(72) Inventors: David Masson, Johanneshov (SE);
Stephan Walter, Bochum (DE)

(73) Assignee: Stora Enso OYJ, Helsinki (FI)

( * ) Notice: Subject to any disclaimer, the term of this
patent is extended or adjusted under 35
U.S.C. 154(b) by 486 days.

(21) Appl. No.: 18/246,215

(22) PCT Filed: Sep. 27, 2021

(86) PCT No.: PCT/IB2021/058784
§ 371 (c)(1),
(2) Date: Mar. 22, 2023

(87) PCT Pub. No.: WO2022/064457
PCT Pub. Date: Mar. 31, 2022

(65) Prior Publication Data
US 2023/0357527 A1     Nov. 9, 2023

(30) Foreign Application Priority Data

Sep. 28, 2020    (SE) .................................... 2051122-6

(51) Int. Cl.
*C08J 9/30*       (2006.01)
*C08J 9/00*       (2006.01)
(Continued)

(52) U.S. Cl.
CPC .............. *C08J 9/30* (2013.01); *C08J 9/0061*
(2013.01); *C08J 9/28* (2013.01); *C08J 9/42*
(2013.01);
(Continued)

(58) Field of Classification Search
CPC ..... C08J 9/30; C08J 9/0061; C08J 9/28; C08J
9/42; C08J 2201/0504; C08J 2205/04;
C08J 2301/02; C08J 2497/02; C08J 9/00;
C08J 9/36; C08J 2497/00; C04B 35/524;
C04B 35/6263; C04B 35/6264; C04B
34/62655; C04B 35/6365; C04B 38/0022;
C04B 2111/00017; C04B 2111/00258;
C04B 2111/00267; C04B 2111/00284;
(Continued)

(56) References Cited

U.S. PATENT DOCUMENTS

| | | | | | |
|---|---|---|---|---|---|
| 3,894,878 | A | * | 7/1975 | Mansmann ........... | C08L 97/005 |
| | | | | | 521/88 |
| 2015/0284252 | A1 | * | 10/2015 | Karthik ................ | C04B 38/067 |
| | | | | | 264/29.7 |

FOREIGN PATENT DOCUMENTS

| | | | |
|---|---|---|---|
| CN | 107021486 | A | 8/2017 |
| CN | 108483443 | A | 9/2018 |

(Continued)

OTHER PUBLICATIONS

Extended European Search Report from corresponding European
application No. 21871810.4 dated Sep. 30, 2024.

(Continued)

*Primary Examiner* — K. Boyle
(74) *Attorney, Agent, or Firm* — Greer Burns & Crain
Ltd.

(57) ABSTRACT

The present invention relates to bio-based carbon foams, a
method for their manufacturing and their use. The method
comprises foaming a slurry of cellulose fibres to obtain a
cellulose fibre foam, adding a biomass component to the
foam, and carbonization of the biomass-cellulose fibre foam.

13 Claims, 1 Drawing Sheet

(51) Int. Cl.

| | |
|---|---|
| *C08J 9/28* | (2006.01) |
| *C08J 9/42* | (2006.01) |

(52) U.S. Cl.
CPC .... *C08J 2201/0504* (2013.01); *C08J 2205/04* (2013.01); *C08J 2301/02* (2013.01); *C08J 2497/02* (2013.01)

(58) Field of Classification Search
CPC ............ C04B 2111/20; C04B 2111/28; C04B 2111/40; C04B 2111/52; C04B 2235/48; C04B 2235/5248; C04B 2235/5436; C04B 2235/5445; C04B 2235/616; C04B 2235/6562; C04B 2235/6567; C04B 2235/77; C04B 2235/775; C04B 38/007; C04B 38/10; C04B 38/0054; C04B 38/0067; C04B 38/103; B01J 2220/4831; B01J 2220/4837; B01J 20/28011; B01J 20/28045; B01J 20/28078; B01J 20/3078; B01J 20/3085; B01J 20/20; C01P 2004/54; C01P 2006/12; C09C 1/44; C01B 32/05; C01B 32/382
See application file for complete search history.

(56) References Cited

FOREIGN PATENT DOCUMENTS

| | | | |
|---|---|---|---|
| CN | 110817837 | A | 2/2020 |
| JP | 2023544541 | A | 10/2023 |
| WO | 2020011587 | A1 | 1/2020 |
| WO | 2020049226 | A1 | 3/2020 |
| WO | 2020049227 | A1 | 3/2020 |
| WO | 2022064456 | A1 | 3/2022 |

OTHER PUBLICATIONS

International Search Report from corresponding PCT application No. PCT/IB2021/058784, mailed on Dec. 23, 2021.
Toni Varila et al., Catalytic Effect of Transition Metals (Copper, Iron, and Nickel) on the Foaming and Properties of Sugar-Based Carbon Foams, Topics in Catalysis (2019) 62: 764-772.
R. Narasimman et al., Preparation of low density carbon foams by foaming molten sucrose using an aluminum nitrate blowing agent, Carbon 50 (2012) 1999-2009.
M. Letellier et al., Tannin-Based Carbon Foams for Electromagnetic Applications, IEEE Transactions on Electromagnetic Compatibility, vol. 57, No. 5, Oct. 2015.

* cited by examiner

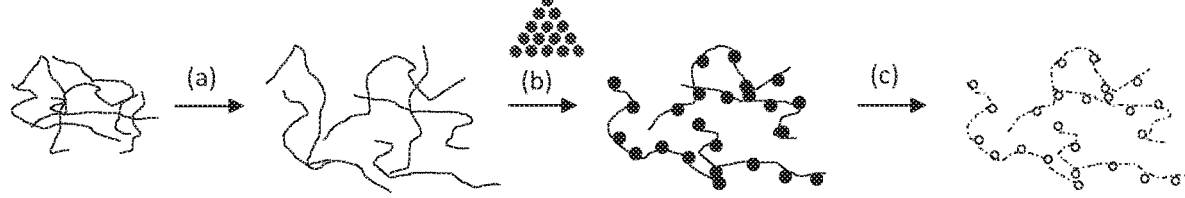

BIO-BASED CARBON FOAM

This application is a U.S. National Phase under 35 U.S.C. § 371 of International Application No. PCT/IB2021/058784 filed Sep. 27, 2021, which claims priority under 35 U.S.C. §§ 119 and 365 to Swedish Application No. 2051122-6 filed Sep. 28, 2020.

FIELD OF THE INVENTION

The present invention relates to bio-based carbon foams, a method for their manufacturing and their use.

TECHNICAL BACKGROUND

In our everyday life, macroporous and microporous materials are used in various forms and compositions. Carbon foams are porous materials formed from a web of carbon atoms and may have a very large specific surface area and a high adsorption capacity. These materials are expected to contribute to modern technologies, for example as electrodes for electrochemical devices, absorbents for large molecules, thermal insulators for aerospace components, and other applications that need lightweight, robust and highly resistant materials.

Known techniques for making carbon foams involve mixing of different precursors. State of art precursors are typically based on fossil-based chemicals such as pitch, isocyanate, polyols, cross linkers, chain extenders and surfactants, but also inorganic compounds, for instance catalysts. Each precursor requires different treatments during the foaming process.

A conventional method for preparing carbon foams is the template route, which comprises the use of commercially available open cell polyurethane foams as a template. The polyurethane foam is impregnated with a slurry, such as a phenolic resin or pitch, and is then cured and carbonized under inert gas to form a carbon-foam structure. This method is simple and easily scalable, but both the template and the precursors are fossil-based. Another method is the direct foaming, which involves generation of bubbles inside a liquid slurry comprising the precursor and blowing agents. The gas bubbles, typically $CO_2$, are generated due to a chemical reaction of the blowing agent during the first step of the foaming process. When a stable porous network has been formed, it is dried out and carbonized under an inert gas. The direct foaming route uses numerous fossil-based precursors. A third method is the indirect foaming, which involves the preparation of a precursor slurry, which is then flushed with nitrogen gas under pressurized atmosphere in a heat insulated reactor. The obtained foam is then dried and carbonized. This process is complex and expensive on large scale.

It is highly motivated to replace fossil-based chemicals with more sustainable alternatives, such as use of renewable raw material resources, and for environmental and human health aspects. Cellulose has a special potential, being the most abundant renewable natural polymers on earth and because of the availability of methods for preparing large volumes on an industrial scale. Cellulose based porous materials are usually produced by using a water slurry of cellulose fibres as starting material. The water should be removed without causing collapse or shrinkage during drying of the wet porous cellulose material. Recently cellulose foams have been prepared from only biomass precursors, bio-foaming agents, water and air, such as described in WO2020/011587. WO 2020/049226 discloses a porous formable material prepared from a lignin-containing fraction obtained from a lignocellulosic material. Publication U.S. Pat. No. 3,894,878 discloses the preparation of a porous formable material from an aqueous solution of lignin. However, there is still a need for environmentally friendly and inexpensive methods for preparing carbon foams.

BRIEF DESCRIPTION OF THE DRAWINGS

FIG. 1 illustrates the steps for preparation of a lignin-cellulose based carbon foam, by (a) foaming a cellulose slurry to provide a cellulose fibre foam, (b) adding lignin (•) to the cellulose fibre foam (-) and (c) carbonization of the dried lignin-cellulose foam (in FIG. 1 (c) ○ represents the carbonized lignin and - •- • represents the carbonized cellulose fibres).

DESCRIPTION OF THE INVENTION

The objective of this disclosure is to provide a carbon foam made from bio-based material.

In a first aspect, the present invention relates to a bio-based carbon foam characterized by having a density from 10 to 80 kg/m³, or from 10 to 60 kg/m³ and a mean pore diameter of from 0.5-10 mm, or from 1 to 10 mm.

The carbon foam according to the present invention has the advantage of being lightweight, non-flammable, resistant to chemicals, high-temperature resistant, permeable to gases and liquids as well as absorbing sound and radiation.

In a second aspect, the present invention relates to a method for the preparation of a bio-based carbon foam, comprising
  a) suspending cellulose fibres in a liquid medium to obtain a cellulose slurry;
  b) foaming said slurry to obtain a cellulose fibre foam;
  c) adding a biomass component to the cellulose fibre foam to obtain a biomass-cellulose fibre foam,
     wherein the biomass component is selected from lignin and lignocellulosic materials; and
  d) carbonization of the biomass-cellulose fibre foam to obtain a bio-based carbon foam.

The cellulose slurry in step (a) may be prepared by soaking dry cellulose fibres in a liquid medium, followed by mixing using standard cellulose disintegration apparatuses. The liquid medium used for suspending the cellulose fibres may be an aqueous solution or water, preferably water. The suspension of the cellulose fibres and biomass component in the liquid medium may be made at a temperature from 10 to 50° C., from 15 to 50° C., or from 20 to 50° C. The cellulose slurry may have a concentration of from 0.1-40 wt % cellulose, or from 0.1-5 wt %, or from 0.2 to 2 wt %, as calculated on the total weight of the cellulose and liquid medium in the slurry.

Additives may also be added to the cellulose slurry. The additive may be suspended in the liquid medium before the addition of cellulose fibres, suspended together with the cellulose fibres, or added to the cellulose slurry after the cellulose fibres have been suspended. The additive may be a foaming agent, a thickener, or a plasticizer, preferably the additive is a bio-based additive. Examples of bio-based foaming agents are proteins, such as gluten, casein, hydrophobin and gelatine. The additive may be added to the cellulose slurry as a powder or as an admixture to obtain a slurry of cellulose fibres and additive with a total solid content of 0.1-40 wt %, or from 0.1-5 wt %, or from 0.2-2 wt %, as calculated on the total weight of the slurry. The ratio of the cellulose fibres to the additive may affect the degree of flocculation and separation of the cellulose fibres.

Foaming of the cellulose slurry may be made by introduction of gas into the slurry. The gas may be introduced to the slurry by whipping or vigorous stirring, by the addition of blowing agents, by pressurizing the slurry with the gas, or by direct introduction of the gas, such as bubbling the gas through the slurry. The gas introduced to the slurry may be selected from carbon dioxide, nitrogen, inert gas, and air, or mixtures thereof. Preferably, the gas is air. Air could be introduced by whipping or vigorous stirring, which are inexpensive and straightforward methods for creating a foam. The foaming may be made at ambient temperature, or at a temperature from 5 to 100° C., from 10 to 100° C., from 10 to 80° C., from 10 to 60° C., from 10 to 40° C., from 15 to 60° C., or from 15 to 40° C. The foaming may be made at an ambient pressure. The foaming may also be made by applying a high pressure followed by a pressure release, such as by applying a pressure in the range from 102-500 kPa, or from 102-300 kPa. The volume of the slurry can increase with several hundred percent when foamed, such as with more than 200%, or even with up to 1000% or more, depending on the amount of dry weight of the cellulose. An advantage with the method according to the present invention is that only moderate heating, or even no heating, is required to obtain the cellulose fibre foam.

The biomass component may be added to the cellulose fibre foam in a dry particulate form, such as a powder, or as particles dispersed in a liquid medium, such as an aqueous solvent or water, and added to the cellulose fibre foam as a biomass dispersion. The biomass component is selected from lignin; and lignocellulosic materials, such as wood particles, pulp, and wood fibres, e.g. dry lignocellulosic fibres, wood flour, fine cut cellulose pulp, sawdust, and lignin powder; and different combinations thereof. The biomass component is preferably lignin. Lignin may be added to the cellulose fibre containing foam in a dry particulate form, such as a powder, or as particles suspended in a liquid medium, such as an aqueous solvent or water. The average particle size may be in the range of from 0.1 μm to 20 μm, from 0.1 μm to 10 μm, from 0.1 μm to 5 μm, or 0.1 to 1 μm. The weight proportion of the biomass component to cellulose fibres is 3:1 to 1:3, preferably 2:1 to 1:2, more preferably 1:1, as calculated on the dry material.

In one embodiment the cellulose fibre foam is dried by removal of the liquid medium before the biomass component is added. The cellulose fibre foam may be cast into desired shapes, such as plates, 3D structures, thin layers, etc, before it is dried. The cellulose fibre foam may be dried until it comprises less than 15 wt %, or less than 10 wt % of the liquid medium, as calculated on the total weight of the cellulose fibre foam. In some embodiments, the first step of the removal of the liquid medium may be drainage, which may be facilitated by gravitation or by vacuum. Drying of the cellulose fibre foam may be performed by various methods. Depending on which liquid medium that has been used, the liquid medium may be evaporated by convective drying or by radiation at room temperature, such as from 15 to 30° C., or from 15 to 25° C.; or by subjecting the cellulose fibre foam to an elevated temperature, such as a temperature above 20° C., for example from 25 to 130° C., from 30 to 100° C., from 30 to 80° C., or from 50 to 80° C. Depending on the stability of the cellulose fibre foam also lower and higher temperatures may be used. Only moderate heating, or even no heating is required to obtain a cellulose fibre containing foam, but an elevated temperature will shorten the time for drying the foam. The residence times for drying the cellulose fibre foam may be from 4 to 60 hours, or from 4 to 48 hours, or from 4 to 24 hours, or from 4 to 12 hours but may be adjusted depending on the drying method used. Different ovens such as baking ovens, curing ovens, drying ovens, vacuum drying ovens, or industrial batch and continuous ovens can be used. The use of microwaves or a combination of microwaves and heat flow to heat the cellulose fibre foam from its inside can further speed up the drying time. However, too high temperature can make the cellulose fibre foam inhomogeneous or even damage the foam, such as causing delamination or collapse of the structure. The drying temperature can also be changed during the drying, for example a lower initial temperature can be used with an increase in temperature over time. The liquid medium may also be removed by solvent exchange, for example water may be removed by solvent exchange with ethanol.

The dried cellulose fibre foam may be impregnated with the biomass component in the form of a biomass dispersion. Impregnation of the cellulose fibre foam with the biomass dispersion may take from 1 hour up to 16 hours. The impregnation may be enhanced by suction to ensure that the biomass dispersion reaches the deepest pores of the cellulose fibre foam. After impregnation, the obtained biomass-cellulose fibre foam may be dried to reduce the content of the liquid medium, such as to a content of the liquid medium that is less than 15 wt % or less than 10 wt %, as calculated on the total weight of the biomass-cellulose fibre foam, before carbonization.

In another embodiment of the method according to the present invention the biomass component is added as a powder to the cellulose fibre foam before the foam is dried. The powder may have an average particle size in the range of from 0.1 μm to 20 μm, from 0.1 to 10 μm, from 0.1 μm to 5 μm, or 0.1 to 1 μm. By adding the powder to the cellulose fibre containing foam at a low shear rate for a long period of time the foam bubbles may be prevented from collapse and the bubble size may be principally unchanged. The addition of biomass component to the cellulose fibre containing foam before drying enables casting of the biomass-cellulose fibre foam into desired shapes, such as plates, 3D structures, thin layers, etc, before it is dried and carbonized.

In any of the embodiments disclosed herein, the biomass-cellulose fibre foam may be dried until it comprises less than 15 wt % or less than 10 wt % of the liquid medium, as calculated on the total weight of the biomass-cellulose fibre foam. Drying of the biomass-cellulose fibre foam may be performed by various methods, such as by drainage, convective drying or by radiation, or a combination of these. The drying may be made at room temperature, such as from 15 to 30° C., or from 15 to 25° C.; or by subjecting the biomass-cellulose fibre foam to elevated temperatures, such as a temperature above 20° C., for example from 25 to 130° C., from 30 to 100° C., from 30 to 80° C., or from 50 to 80° C. Only moderate heating, or even no heating is required to obtain a biomass-cellulose fibre containing foam, but an elevated temperature will shorten the time for drying the foam. Drainage may be facilitated by gravitation or by vacuum. The residence times for drying the biomass-cellulose fibre foam may be from 4 to 60 hours, or from 4 to 48 hours, or from 4 to 24 hours, or from 4 to 12 hours but may be adjusted depending on the drying method used. Different ovens such as baking ovens, curing ovens, drying ovens, vacuum drying ovens or industrial batch and continuous ovens can be used. The use of microwaves or a combination of microwaves and heat flow to heat the biomass-cellulose fibre foam from its inside can further speed up the drying time. However, too high temperature can make the biomass-cellulose fibre foam inhomogeneous or even damage the foam, such as causing delamination or collapse of the structure. The drying temperature can also be changed during the drying, for example a lower initial temperature can be used with an increase over time. The liquid medium may also be removed by solvent exchange, for example water may be removed by solvent exchange with ethanol.

In any of the embodiments disclosed herein the amount of the biomass component in the biomass-cellulose fibre foam may be from 20-70 wt %, preferably 30-60 wt %, more preferably 40-60 wt %, as calculated on the total weight of the dry components in the foam.

In the method according to the present invention, carbonization of the biomass-cellulose fibre foam may be made by raising the temperature in one or more steps at rates between 1 to 100° C./min, until a maximum temperature, $T_{max}$, in the range from 700 to 1500° C., is reached, more preferably the maximum temperature is from 800 to 1300° C., most preferably the maximum temperature is from 950 to 1150° C. The total time for the carbonization, including cooling, may be from 15 to 20 hours. The carbonization may be performed under inert gas, such as nitrogen, helium, neon, or argon, or mixtures thereof. An advantage with the method according to the present invention is that carbonization may also be made on a moist biomass-cellulose foam, such as a foam that have been subjected to only drainage of the liquid medium. Carbonization of the dried biomass-cellulose fibre foam provides for a carbon foam that in principle have the same porous structure as the dried biomass-cellulose fibre foam. Moist biomass-cellulose fibre foam can be collected and saved for later use, or for filling a mould, or by any other manner be formed to a desired shape, which enables the preparation of a carbon foam with a pre-determined shape after carbonization. Thus, one embodiment of the method of the present invention encompasses carbonization of a shaped biomass-cellulose fibre foam for providing a shaped carbon foam. After carbonization the carbon foam may be kept in the obtained shape or be machined to desired shapes.

With the method according to the present invention, the cellulose fibre foam acts as a porous template, such as a mechanical and structural support, for the biomass component during carbonization. The pores occurring in the cellulose fibre foam may be preserved during the mixing or impregnation with the biomass component as well as during the carbonization, which provides for a low-density carbon foam. The carbon foam obtained after carbonization may in principle have the same porous structure as the biomass-cellulose fibre foam. Further effects of using cellulose fibre containing foam as a template, is a smaller pore size and an even pore size distribution of the final carbon foam. The amount and type of added bio-mass component enables tailoring of pore sizes, pore characters and final chemical composition of the carbon foam. The biomass component, and especially lignin, also prevents shrinkage of the foam during carbonization. Overall, the present method enables tailoring of the properties and characteristics of the carbon foam, for example pore sizes, density, open area per volume, stiffness, and hardness.

The carbon foam prepared according to the method of the present invention may be modified with additional components, such as hydrophobic agents, activating gas, coating layers or other chemicals; by thermal post-treatment; or a combination of these. The carbon foam may be activated to provide the foam with desired properties, such as specific absorbance properties or an increased specific surface area.

Activation may be made by treating the foam with activation chemicals and heating to a temperature of 400 to 800° C., or by treating the foam with a gas at a temperature of about 800 to 1100° C. Suitable activation chemicals are selected from alkali salts, phosphoric acid, zinc chloride and sulfuric acid or a mixture thereof. The activation chemicals may assist in removal of remaining moisture from the material. Suitable gases for activation are selected from water vapor and carbon dioxide or a mixture thereof.

The present invention specifically encompasses a method for the preparation of a bio-based carbon foam, wherein the method comprises suspending cellulose fibres in a liquid to obtain a slurry; foaming the slurry to obtain a cellulose fibre containing foam; adding lignin powder to the cellulose fibre containing foam; optionally casting the foam into shapes i.e. plates, 3D structures, thin layers, or other; drying the lignin-cellulose fibre foam; and carbonization of the foam.

The present invention also encompasses a method for the preparation of a bio-based carbon foam, wherein the method comprises suspending cellulose fibres in a liquid to obtain a slurry; foaming the slurry to obtain a cellulose fibre containing foam; drying said cellulose fibre containing foam; dispersing lignin particles in a liquid medium, such as an aqueous solvent or water, to obtain a lignin dispersion; impregnating the dried cellulose fibre containing foam with the lignin dispersion to obtain a lignin-cellulose fibre foam; drying the lignin-cellulose fibre foam; and carbonization of the lignin-cellulose fibre foam.

An advantage with the method of the present invention is that it is environmentally friendly, involves simple technology and is easily scalable. The main components used in the method are bio-based and renewable. The liquid medium may be an aqueous solution or water.

In a third aspect, the present invention relates to a bio-based carbon foam obtained with the method according to the second aspect of the invention. A further aspect of the present invention is an integral bio-based carbon foam comprising a porous core having a density and wherein the foam becomes denser closer to its surfaces. The integral structures resemble the structure of mammal bones and may therefore be used as a bone implant material and as scaffolds for osteogenic cells.

A yet further aspect is the use of the bio-based carbon foam according to the present invention in electrodes for electrochemical devices, absorbents for large molecules, adsorbents, thermal insulators for high temperature applications, aerospace components, energy storage, catalyst substrates, and stealth technology.

All words and abbreviations used in the present application shall be construed as having the meaning usually given to them in the relevant art, unless otherwise indicated. For clarity, some terms are however specifically defined below.

The term bio-based material is used herein for any material made from substances derived from living, or once-living, organisms, plants, such as material obtained from wood, lignocellulosic materials, cellulose fibres, lignin, starch, proteins, polylactic acid, etc.

Cellulose is the main component in the cell walls of all plants. It can occur with different components depending on the type or part of the plant. In wood for example, cellulose occurs together with lignin and hemicelluloses. In leaves, the cellulose occurs lignin free but together with rich amounts of hemicelluloses. In the seed hairs of cotton, cellulose occurs in almost pure forms, free of lignin. The cellulose fibres suitable for preparing the carbon foam according to the present invention can originate from wood, such as softwood or hardwood, from leaves or from fibre crops (including cotton, flax and hemp). Suitable cellulose fibres can also originate from regenerated cellulose such as rayon and Lyocell. Preferably the cellulose fibres originate from wood, more preferably the cellulose fibres are pulp fibres obtained by pulping processes which liberates the fibres from the wood matrix. Pulp fibres can be liberated by mechanical pulping, obtaining mechanical pulp such as thermo mechanical pulp (TMP) or chemo thermo mechanical pulp (CTMP), or by chemical pulping such as Kraft pulp or pulps obtained by the sulphite process, soda process or organosolv pulping process. More preferably, the cellulose fibres are pulp fibres liberated by chemical pulping processes. Even more preferably the cellulose fibres are obtained from softwood Kraft pulp or dissolving pulp. The cellulose fibres used in the present invention may be free from lignin and hemicellulose. The different characteristic of each cellulose will affect the properties of the final carbon foam. A cellulose fibre is significantly longer than it is wide. Cellulose fibres can have a mean width of 0.01 to 0.05 mm. The mean fibre length of softwood can be from 2.5 to 4.5 mm, while hardwood can have a mean fibre length from 0.7 to 1.6 mm, and Eucalyptus from 0.7 to 1.5 mm. However, the fibre length can vary considerably with different growing place, etc. The cellulose fibres used for the preparation of the carbon foam disclosed herein can have a mean fibre length from 0.1 mm to 65 mm, from 0.1 mm to 10 mm, or from 0.5 mm to 65 mm, or from 0.5 mm to 10 mm, or from 0.5 mm to 7 mm. Different fibre lengths may provide different mechanical characteristics to the material. Due to the length of fibres, they can entangle with each other and impart fibre to fibre interbonds that bring strength to the foam structure. The aspect ratio, i.e. the ratio of the fibre length to the fibre width, of the cellulose fibres used for the preparation of the carbon foam according to the present invention can be at least 10, at least 25, at least 50, at least 75, or at least 100, which provides for preservation and stabilization of the foam structure during the drying procedure. The aspect ratio can be up to 6500, or preferably up to 2000.

The high aspect ratio, i.e. the length to width ratio, of the cellulose fibres may provide flexibility to the final bio-based carbon foam. The predominant orientation of cellulose fibres enables the formation of different macro-structures in the foam that may affect the outgassing during carbonization and hence the carbonization kinetics, which in turn may influence the properties of the final bio-based carbon foam.

Lignins are cross-linked phenolic polymers that provides rigidity in the formation of cell walls, especially in wood and bark, in that it fills the spaces in the cell wall between cellulose, hemicellulose, and pectin components. The polymers lack a defined primary structure, and the exact chemical composition of lignin varies from species to species, but it is relatively hydrophobic and rich in aromatic subunits. Lignin is an often undesired by-product in the manufacture of cellulose and is the biggest renewable source of carbon in the world after cellulose. Lignin for use in the present method preferably has a specific mean particle size in the range of from 0.1 to 10 μm. Particles within the preferred size range provides for a good adherence to the cellulose fibres. For some applications, the ash content of the lignin should preferably be as low as possible.

The density of the carbon foam is determined with the equation (1):

$$Density = \frac{m}{v} \quad (1)$$

where, m is the mass of a piece of the carbon foam, and V is the volume of said piece of carbon foam.

The void spaces in the carbon foam according to the present invention may be in the form of interconnected pores, such as that at least 50%, at least 70%, or at least 80%, of the total volume of the void spaces of porous material according to the present invention may comprise interconnected pores. The mean pore diameter and the pore volume may be determined by conventional methods, such as by image analysis using microscopy. The porosity of the carbon foam may be in the range of 50 to 99%. The term "porosity", φ, is used for the ratio between the total volume of the pores, $V_P$, and the total volume, V, of the carbon foam. The porosity may be determined by conventional methods, such as by image analysis using microscopy.

The "specific surface area" denotes the total surface area of the solid material per unit mass and can be determined by pycnometry. The carbon foam according to the present invention may have a specific surface area of from 500 to 1500 $m^2$/g.

It should be noted that embodiments and/or features and/or advantages described in the context of one of the aspects and/or embodiments of the present invention may also apply mutatis mutandis to all the other aspects and/or embodiments of the invention.

Examples

The features according to the present invention are further illustrated in the following examples.
Materials
Dried cellulose foam is provided by Cellutech AB and softwood kraft lignin powder is obtained from Stora Enso AB.

Examples

The lignin powder is dispersed in water and a lignin dispersion is obtained. Additives are optionally added to improve the solubility of the lignin. The cellulose foam is impregnated with the lignin dispersion. The impregnated lignin-cellulose foam is dried followed by carbonization. The density and pore size distribution of the foam is determined.

The invention claimed is:
1. A method for the preparation of a bio-based carbon foam, the method comprising
   a. suspending cellulose fibres in a liquid medium to obtain a cellulose slurry;
   b. foaming said cellulose slurry to obtain a cellulose fibre foam;
   c. adding a biomass component to the cellulose fibre foam to obtain a biomass-cellulose fibre foam, wherein the biomass component is selected from lignin and lignocellulosic materials; and
   d. carbonization of the biomass-cellulose fibre foam to obtain a bio-based carbon foam.
2. The method according to claim 1, wherein a weight proportion of the biomass component to the cellulose fibres is between 3:1 to 1:3, as calculated on a dry material.
3. The method according to claim 1, wherein the liquid medium for suspending the cellulose fibres is water.
4. The method according to claim 1, wherein the cellulose slurry has a concentration of from 0.1-40 wt % cellulose fibres, as calculated on a total weight of the cellulose fibres and liquid medium in the slurry.

5. The method according to claim 1, wherein the cellulose fibre foam is cast into a desired shape.

6. The method according to claim 1, wherein the cellulose fibre foam is dried.

7. The method according to claim 6, wherein the dried cellulose fibre foam is impregnated with a biomass component dispersed in a liquid medium.

8. The method according to claim 1, wherein the biomass component is added as a powder to the cellulose fibre foam.

9. The method according to claim 8, wherein the biomass-cellulose fibre foam is cast into a desired shape.

10. The method according to claim 1, wherein the biomass-cellulose fibre foam is dried.

11. The method according to claim 1, wherein the biomass component is lignin.

12. The method according to claim 1, wherein the carbonization comprises raising a temperature in one or more steps at rates between 1 to 100° C./min, until a maximum temperature, $T_{max}$, in the range from 700 to 1500° C., is reached.

13. The method according to claim 1, wherein the carbonization is performed under inert gas.

\* \* \* \* \*